Patented Oct. 27, 1936

2,059,125

UNITED STATES PATENT OFFICE 2,059,125

INSECTICIDE

Frank H. Lyons, Memphis, Tenn., assignor to E. L. Bruce Company, Memphis, Tenn., a corporation of Delaware No Drawing. Application June 29, 1931, Serial No. 547,791. Renewed March 16, 1936

4 Claims. (Cl. 167—30)

My invention relates to an insecticide and has particularly in view a spraying composition for exterminating termites and the like that may have infested a building.

One of the objects is to provide a composition that will kill the termites by contact of the composition on the body of the termites, by ingestion and by the vapor of the toxicants, as well as to provide a composition in which after evaporation of the solvents, a toxic residue will be left behind which will prevent the termites from reinfesting the structure.

A mixture of about 50% by volume of orthodichlorobenzol and varnish maker's and painter's naphtha is very effective in killing termites, both being contact and vapor poisons for termites. Although the former is much more toxic than the latter it is much more expensive. Both of these components are volatile and after evaporation there is no toxicant left.

In order to have some permanent toxicant that would remain behind to guard against reinfestation of the structure by the termites, I may dissolve in the aforesaid mixture about 1% of B-naphthol, which is about all that will go into solution in this mixture. After evaporation of the naphtha and the orthodichlorobenzol, the B-naphthol will remain behind in solid form.

As just indicated, B-naphthol is soluble in varnish maker's and painter's naphtha in only small proportions. It is however, very soluble in ethyl alcohol.

In my copending application, Ser. No. 500,892, filed December 8, 1930, I have disclosed that the solubility of B-naphthol and other organic toxicants in varnish maker's and painters's naphtha can be greatly increased so that for instance the amount of B-naphthol that goes into solution in the treating composition can be increased up to about 10%, thereby providing a much more concentrated permanent toxicant. Accordingly if to a solution of B-naphthol in alcohol, a certain amount of rosin is added, then on mixing with varnish maker's and painter's naphtha the solution will remain clear. This mixture is then added to the mixture of orthodichlorobenzol and naphtha.

The following formula has been found to be very efficient in exterminating termites and preventing reinfestation:

| | Pounds |
|---|---|
| Alcohol | 690 |
| B-naphthol | 432 |
| Rosin | 432 |
| Orthodichlorobenzol | 2,398 |
| V. M. and P. naphtha | 3,520 |

To mix the ingredients, the alcohol is put into the mixer and pale powdered rosin added. After agitating for fifteen minutes, the B-naphthol is added and stirred for ten minutes. The mixture of varnish maker's and painter's naphtha and orthodichlorobenzol is then added slowly with constant stirring. All these components will be found to be compatible with each other and there will be no separation. Heretofore, it has not been possible to dissolve more than traces of 95% ethyl alcohol in varnish maker's and painter's naphtha. The solubility of large percentages of ethyl alcohol in varnish maker's and painter's naphtha is brought about by the addition of rosin to the solution. The presence of the toxicant in the alcohol does not affect to any substantial extent, the solubility of the alcohol in the varnish maker's and painter's naphtha and the orthodichlorobenzol either with or without the presence of rosin.

As alcohol is much more expensive than the naphtha, it is desirable to use as little alcohol as possible. The proportion of alcohol given in the example is about the least practical amount that can be used. Using this proportion of alcohol, the toxicant will remain in solution at room temperature but some will have a tendency to crystallize out at low temperatures.

The maximum amount of rosin that can be used is determined only by the limits of its solubility in the solvents.

The naphtha will be used in the greatest practical proportions. It will be understood that the naphtha is the diluent or carrying agent and its proportion in the formula will depend upon how concentrated the treating composition should be.

Instead of using ethyl alcohol, with rosin, I may use propyl alcohols, or butyl alcohols, or amyl alcohols with or without rosin, for getting the B-naphthol into solution in the naphtha. I can also use acetates or ketones, with or without rosin.

There are many other organic toxicants that are soluble in alcohol and that can be dissolved in a rosin and varnish maker's and painter's naphtha medium. The following are found to be adaptable for this purpose: p-dichlorobenzene, 1-3-5-trichlorobenzene, m-dihydroxy-benzene (resorcinol), o-dihydroxy-benzene (catechol), 1-2-3-trihydroxybenzene (pyrogallol), mono-benzene-sulphonic acid, diphenyl, alpha-naphthol, beta-naphthol, alpha-naphthylamine, beta-chloro-naphthalene, alpha-nitro-naphthalene and orthophenyl-phenol.

Instead of using rosin in the composition as a blending agent, I may use calcium resinate, which is a limed rosin and also ester gums, which are the esters of abietic acid. The active agent in rosin is abietic acid. The following may be used in place of abietic acid: stearic acid, oleic acid, Canada balsam, linseed oil acids, China-wood oil acids and palmitic acid. In addition, the products formed by the partial neutralization of these acids by organic or inorganic bases as well as the esters of these acids may be used.

Varnish maker's and painter's naphtha is defined as a petroleum distillate with initial boiling point not less than 100° F. and an end point of 550° F. I prefer one that has an initial boiling point from 200–300° F. and an end point around 412° F.

Orthodichlorobenzol is a good volatile vapor toxicant. Instead of orthodichlorobenzol, I can use the extract of pyrethrum or para dichlorobenzol, but the orthodichlorobenzol is the cheapest.

I claim:

1. An insecticide comprising principally orthodichlorobenzol and a volatile petroleum solvent, and containing also alcohol, B-naphthol and rosin.

2. An insecticidal composition, all the ingredients of which are miscible to form a clear solution, comprising principally orthodichlorobenzol and a volatile petroleum solvent and containing 1–10% of B-naphthol, and a solubilizing agent for increasing the solubility of the B-naphthol in the petroleum solvent.

3. An insecticidal composition, all the ingredients of which are miscible to form a clear solution, comprising principally a dichlorobenzol and a volatile petroleum solvent and containing an amount of B-naphthol which is normally insoluble in the petroleum solvent and a solubilizing agent for increasing the solubility of the B-naphthol in the petroleum solvent.

4. An insecticide in substantially the following proportions:

| | Pounds |
|---|---|
| Alcohol | 690 |
| B-naphthol | 432 |
| Rosin | 432 |
| Orthodichlorobenzol | 2,398 |
| V. M. and P. naphtha | 3,520 |

FRANK H. LYONS.